Nov. 12, 1963 J. MURGIO 3,110,894
DIGITAL-TO-ANALOG CONVERTER
Filed April 9, 1959 4 Sheets-Sheet 1

INVENTOR.
JOSEPH MURGIO
BY Percy P. Lantzy
ATTORNEY

Nov. 12, 1963 J. MURGIO 3,110,894

DIGITAL-TO-ANALOG CONVERTER

Filed April 9, 1959 4 Sheets-Sheet 2

INVENTOR.
JOSEPH MURGIO

BY [signature]
ATTORNEY

Nov. 12, 1963 J. MURGIO 3,110,894

DIGITAL-TO-ANALOG CONVERTER

Filed April 9, 1959 4 Sheets-Sheet 3

INVENTOR.
JOSEPH MURGIO
BY [signature]
ATTORNEY

Nov. 12, 1963 J. MURGIO 3,110,894

DIGITAL-TO-ANALOG CONVERTER

Filed April 9, 1959 4 Sheets-Sheet 4

INVENTOR.
JOSEPH MURGIO
BY Percy P. Lantzy
ATTORNEY

United States Patent Office 3,110,894

Patented Nov. 12, 1963

3,110,894

DIGITAL-TO-ANALOG CONVERTER

Joseph Murgio, Clifton, N.J., assignor to International Telephone and Telegraph Corporation, Nutley, N.J., a corporation of Maryland Filed Apr. 9, 1959, Ser. No. 805,172
6 Claims. (Cl. 340—347)

This invention relates to digital-to-analog converting devices and more particularly to a device for converting a stored digital number into a pulse rate, said pulse rate bearing a predetermined relationship to the stored number. In one application of the present invention the pulse rate is integrated by suitable electrical-mechanical integrating means producing an analog signal representative of the stored number.

In the past, numerous systems, all somewhat similar in nature, have been employed to convert a stored digital number into an equivalent analog signal. The stored digital number is usually represented as a number of bits arranged successively or in some increasing order, the ratio of the significance of each bit to the significance of the next higher bit being maintained constant. One most common relationship between successive bits of such a stored number is as powers of two and this is usually called a binary weighted number. However, other relationships between successive bits of a stored number may be employed for certain applications. Different methods are employed to represent each bit of the stored number, the most common of these methods being the binary representation, such as obtained by the use of a simple "on" or "off" switch or a bistable multivibrator, a single stage of which produces a voltage output or does not produce a voltage output depending on how energized. When such binary techniques are employed to represent each bit of the stored number, the conversion of said number into an equivalent analog signal is readily accomplished.

In some prior systems in which each bit is represented by a binary device, each of the binary devices produces a given signal output or produces no signal output depending on the stored number represented by the binary devices. If the signals from the binary devices are "on" or "off" voltages, the outputs from each binary device representing each bit of the stored number, may be coupled to a different impedance input to a summing amplifier. If the binary devices are all identical, then the different impedances must be rated in accordance with the relative significance of each of the binary bits represented by the outputs of each binary device. Consequently, the summing amplifier serves to sum voltages weighted in proportion to the significance of each binary bit of the stored digital number producing a voltage output which is an analog representation of the stored number. Such prior systems for converting a digital number into an equivalent analog signal require that the number be represented by binary devices having precisely controlled voltage outputs. In such prior systems it is not merely necessary that the output from each binary device be sufficiently representative of an "on" or "off" condition; on the contrary, the output of each binary device must be a precisely "on" at a given voltage and precisely "off" at another given voltage (for example ground potential). If these conditions are not met, the system suffers inaccuracies. Other inaccuracies are introduced by the summing amplifier which is somewhat approximate in operation.

One object of the present invention is to provide means for converting a stored digital number into an equivalent analog signal having none of the disadvantages of the prior systems.

Another object is to provide means for converting a stored digital number into an equivalent pulse rate signal, said pulse rate being proportional to the stored number.

Another object is to provide pulse selection means for selecting pulses from a pulse generator to produce a rate of selected pulses which is proportional to the product of a stored digital number times the pulse rate from the generator, said stored digital number serving to control said means for selecting pulses.

Another object is to provide means for converting a stored parallel digital number into an equivalent pulse rate and means for converting a stored serial digital number into an equivalent pulse rate.

Still another object is to provide means for converting a stored serial digital number into an equivalent pulse rate, said pulse rate being proportional to the product of said stored number times another pulse rate.

It is a feature of the present invention to provide means for storing a multiple bit digital number with means coupled thereto for generating and combining a plurality of separate signal rates, each signal rate being representative of a different one of said multiple bits and each of said rates being proportional to the significance of said represented bit.

Another feature is to provide means for storing a multiple bit digital number, pulse generating means, pulse counting means coupled to said generating means for producing a plurality of different pulse rates, each rate being proportional to the significance of a different one of said multiple bits with gating means coupled to said storing means and said counting means whereby said different pulse rates are selected by their corresponding bits to produce the signal rate proportional to the stored number.

A feature of one embodiment is to provide means for storing a multiple bit digital number, a pulse generator, a plurality of pulse counters each coupled to said pulse generator and each producing a different pulse rate, the pulse rates being related to each other in the same manner as the significance of the bits forming the stored number, a plurality of gating means each controlled by a different one of said bits for gating a different one of said pulse rates and means for combining the outputs of the plurality of gating means to produce an output signal rate proportional to the stored number.

A feature of another embodiment is to provide means for storing a multiple bit serial digital number, a pulse generator, a frequency divider coupled to said pulse generator, a first counter coupled to said frequency divider, a second counter coupled to said pulse generator, means for coupling predetermined stages of said first counter to predetermined stages of said second counter whereby predetermined binary numbers are set in said second counter each time said frequency divider feeds a pulse to the first counter and coincidence means coupled to said serial digital number storage means and also coupled to the overflow from the second counter for producing signals at a rate proportional to the stored number.

Other and further objects and features of the present invention will become more apparent from the following specific description of the embodiments of the present invention taken in conjunction with the figures in which.

Figure 1:
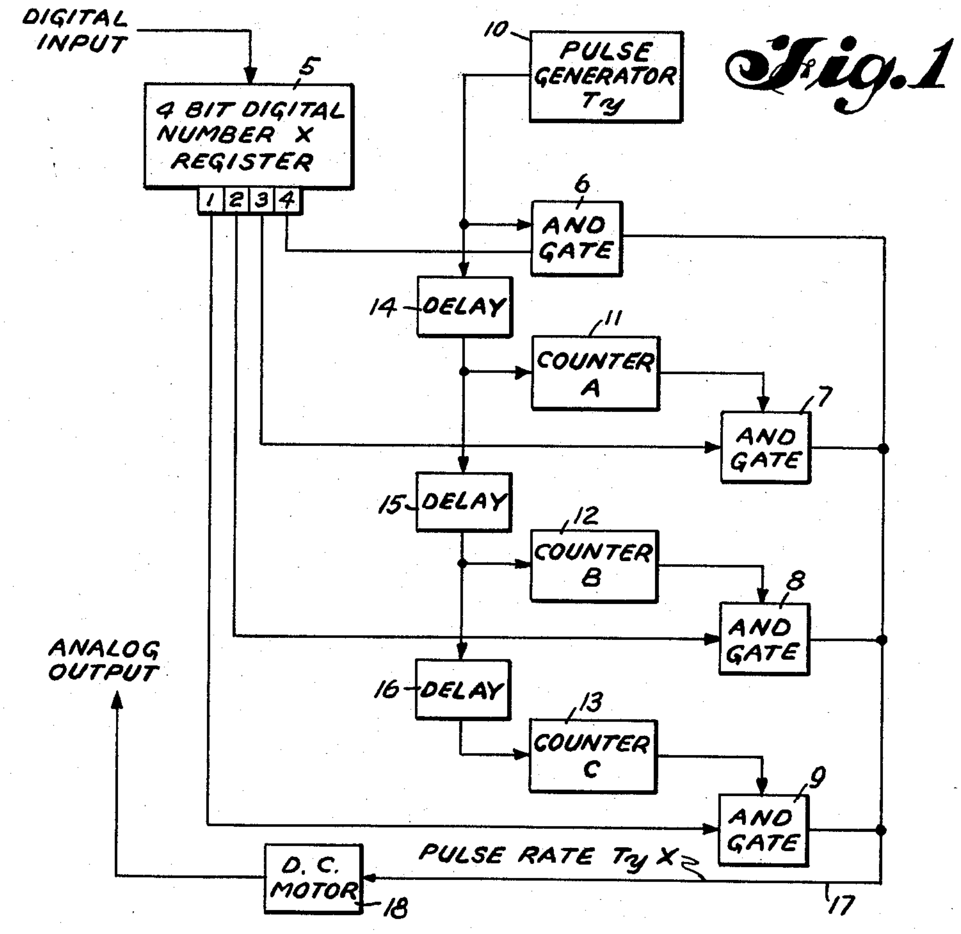
FIG. 1 is a block diagram describing a circuit for converting a stored parallel digital number into an equivalent pulse rate.

Turning first to FIG. 1, there is shown a four-bit digital number register. The binary devices for representing the bits are denoted 1, 2, 3 and 4 and the complete register is denoted 5. This type of register is sometimes referred to as a parallel number register and may be controlled by any of numerous known devices, such as the output from a digital counter or another parallel number register. Each of the binary devices 1, 2, 3 and 4 controls a different "and" gate, device 4 controlling "and" gate 6, device 3 controlling "and" gate 7, device 2 controlling "and" gate 8 and device 1 controlling "and" gate 9. Pulse generator 10 provides pulses at a rate denoted $T_y$ which are applied to "and" gate 6, counter A, denoted 11, counter B, denoted 12 and counter C, denoted 13. Suitable delay circuits 14, 15 and 16 are provided for delaying $T_y$ pulses before they are applied to counters A, B and C. As shown in the figure, $T_y$ pulses are delayed by delay 14 before being applied to counter A, they are delayed by delays 14 and 15 before being applied to counter B and they are delayed by delays 14, 15 and 16 before being applied to counter C. Consequently, counters A, B and C are pulsed successively one after another by each $T_y$ pulse.

Figure 2:
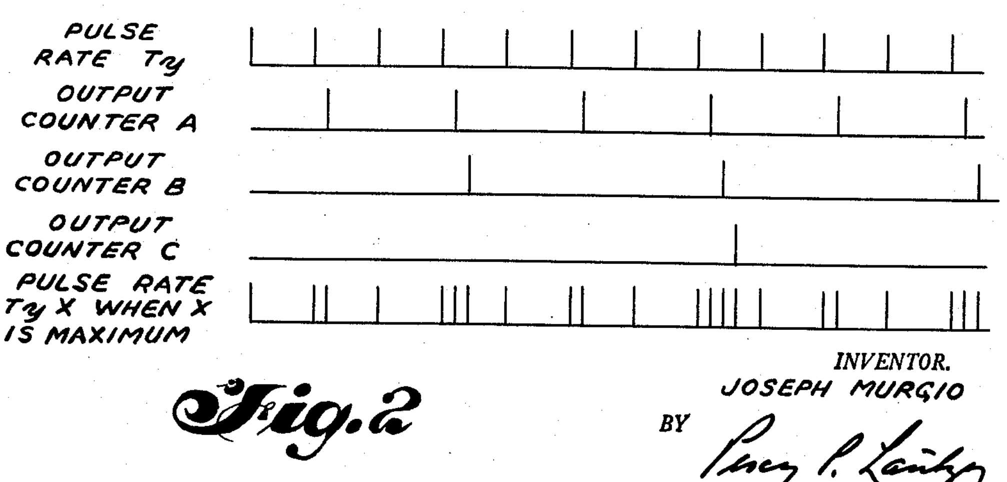
FIG. 2 depicts various pulse waveforms illustrating the operation of the system shown in FIG. 1.

In the system shown in FIG. 1, the pulse rate $T_y$ is representative of the fourth or most significant bit in the four-bit parallel digital number stored in register 5. Consequently, whenever binary device 4 produces a positive output indicating the presence of the fourth and most significant bit in the stored number, "and" gate 6 opens allowing $T_y$ pulses to be applied to line 17. Binary devices 3, 2 and 1 act in the same manner to control "and" gates 7, 8 and 9, respectively, as binary device 4 acts to control "and" gate 6. Counters A, B and C denoted 11, 12 and 13 each have a different number of stages, the number of stages in each case being determined by the relative significance of bits 3, 2 and 1 of the parallel digit numbers stored in register 5. For example, if the fourth and most significant bit of the number X stored in register 5, represents eight and the third represents four and the second represents two and the first represents one, then counter A counts two $T_y$ pulses before producing and output pulse to "and" gate 7, counter B counts four $T_y$ pulses before producing an output pulse to "and" gate 8, and counter C counts eight $T_y$ pulses before producing an output pulse to "and" gate 9. Consequently, pulses are produced in line 17 from "and" gates 6, 7, 8 and 9 at an average repetition rate equivalent to $T_y$ times the number X. If each pulse in line 17 contains the same amount of energy, a simple rate converter device may be employed such as a D.C. motor, the shaft rotation rate from said motor being an analog representation of the number X stored in register 5. In FIG. 2 there are shown pulse waveforms representing the outputs of generator 10, counters A, B and C and pulses in line 17, when the four-bit number stored in register 5 is a binary weighted number and the stored number X is maximum at a value of fifteen. For such a system counter A counts every second $T_y$ pulse, counter B counts every fourth $T_y$ pulse and counter C counts every eighth $T_y$ pulse and the delay devices 14, 15 and 16 all cause the same time delay which is approximately one fifth of the interval between successive $T_y$ pulses.

Figure 3:
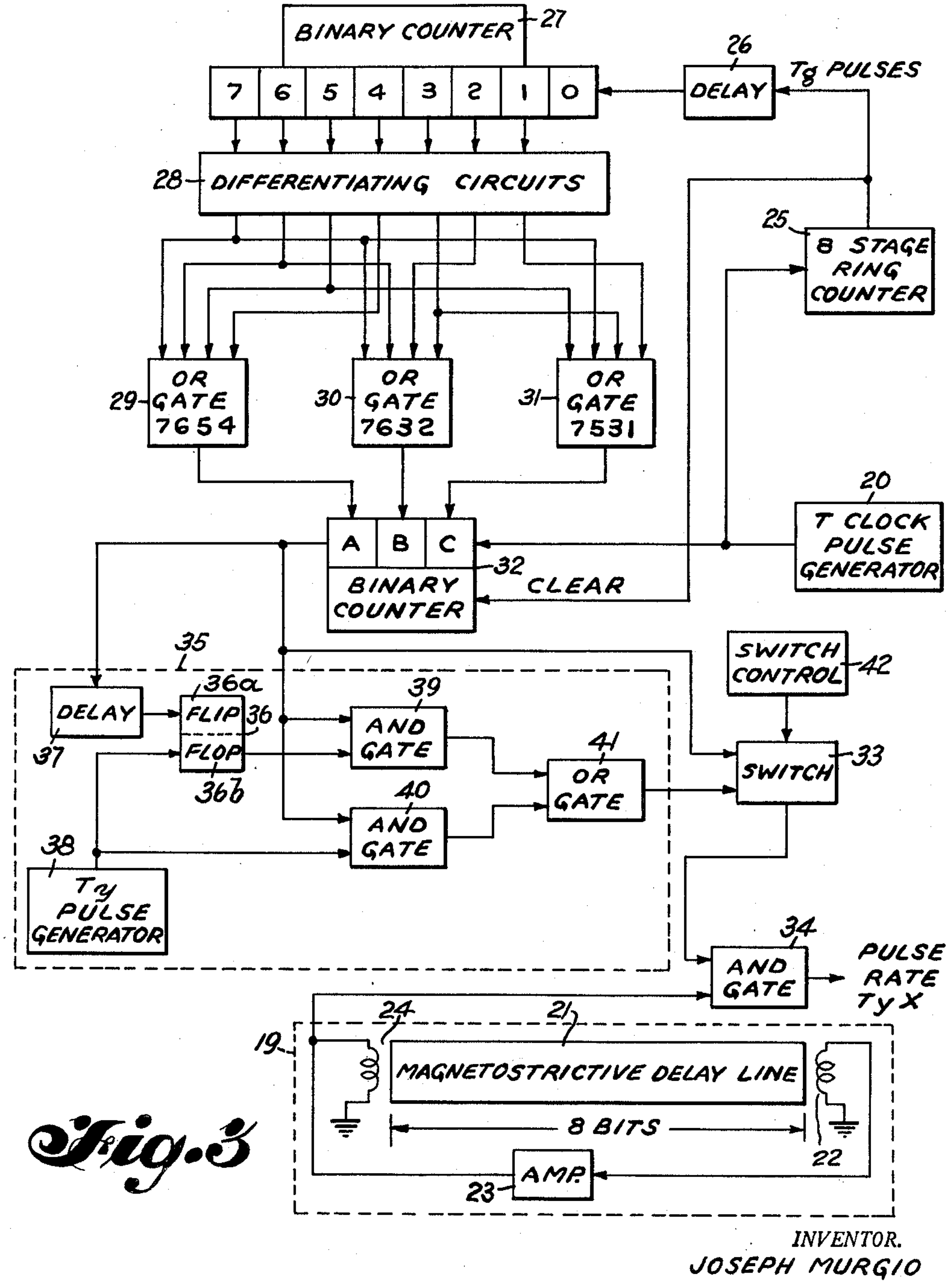
FIG. 3 is a block diagram showing circuits for converting a stored serial digital number into an equivalent pulse rate.

Turning next to FIG. 3, there is shown a device 19 for storing a multiple bit serial digital number, each bit in coincidence with clock pulses from a clock pulse generator 20. In the device as shown in FIG. 3, the serial digital number stored in device 19 is an eight-bit number. Device 19 might for example consist of a magnetostrictive delay line 21 circulating number bits synchronized with pulses from clock 20, the delay period being equivalent to the interval of eight successive clock pulses. The stored number is represented by successive pulses in magnetostrictive delay line 21, these pulses are maintained circulating through delay line 21 and, thereby stored in the delay line, by the action of detection coil 22 which detects pulses which arrive at the end of delay line 21 and applies these detected pulses to amplifier 23 which in turn energizes coil 24 introducing pulses at the other end of delay line 21. Coil 24 introduces successive pulses to delay line 21, least significant bit first, consequently, these pulses circulate through the system composed of line 21, coil 22, amplifier 23 and coil 24, least significant bit first. The output from clock pulse generator 20 is applied to an eight-stage ring counter 25 which produces a single output pulse, denoted $T_8$ pulse, each time the ring counter is energized by eight clock pulses. Consequently, the interval between $T_8$ pulses is eight times the interval between clock pulse. There are numerous methods for synchronizing delay device 19 with clock pulse generator 20 and for insuring that the most significant bit of a number stored in the device 19 is applied to coil 24, during a predetermined interval between $T_8$ pulses. One method for accomplishing this is described on page 71, vol. III of Basics of Digital Computers, by Murphy, published in June 1958 by Rider Publishing Company.

The $T_8$ pulses from ring counter 25 are applied through a suitable delay device 26 to an eight-stage binary counter 27. The binary devices representing each of the stages of counter 27 are numbered 0 to 7, inclusive. Each of these binary devices of counter 27 might, for example, produce a positive voltage output representing one bit of the binary number registered in counter 27 when the bit is present and a ground output when the bit is not present. Consequently, upon differentiating the output from each of the binary devices, numbered 0 to 7, by means of differentiating circuits 28, a positive pulse will be produced when each binary device output goes from ground to the positive voltage. The differentiated outputs from the binary devices are applied to "or" gates 29, 30 and 31 as shown in the figure. The differentiated outputs from stages 7, 6, 5 and 4 are applied to "or" gate 29, the differentiated outputs from stages 7, 6, 3 and 2 are applied to "or" gate 30 and the differentiated outputs from stages 7, 5, 3 and 1 are applied to "or" gate 31. These "or" gates, 29, 30 and 31, in turn set stages A, B and C of a second binary counter 32, each time counter 32 is cleared by a $T_8$ pulse. Counter 32 serves to count clock pulses from clock pulse generator 20 during the interval between $T_8$ pulses commencing with whatever number is set by the outputs from "or" gates 29, 30 and 31 into stages A, B and C of binary counter 32.

In operation, the overflow or carry signal from stage A of binary counter 32 will occur in coincidence with each $T_8$ pulse, provided "or" gates 29, 30 and 31 have not sent a number into stages A, B and C. If a number has been set into stages A, B and C, this overflow pulse will occur between $T_8$ pulses at a time position representative of the number set. Let the time positions between $T_8$ pulses be coincident with the seven clock pulses preceding each $T_8$ pulse and denoted $T_7$, $T_6$, $T_5$, $T_4$, $T_3$, $T_2$, and $T_1$ pulses. By observation it will be seen that the overflow pulse from stage A will be in time coincidence with $T_8$ pulses twice as often as it will be in coincidence with $T_7$ pulses and it will be incoincidence with $T_7$ pulses twice as often as it will be in coincidence with $T_6$ pulses and in general, t will be in coincidence with $T_n$ pulses twice as often as it will be in coincidence with $T_{n-1}$ pulses. In the table below there are shown horizontal pairs of rows, the upper row of each pair represents the number counted to by the counter 27 and the lower row of each pair represents the corresponding position of the overflow pulse from stage A, that position being represented by numbers 1 through 8 which indicate $T_1$, $T_2$, $T_3$, $T_4$, $T_5$, $T_6$, $T_7$ and $T_8$.

*Table*

| | | | | | | |
|---|---|---|---|---|---|---|
| 1, 2 | 3, 4 | 5, 6 | 7, 8 | 9, 10 | 11, 12 | 13, 14 |
| 8, 7 | 8, 6 | 8, 7 | 8, 5 | 8, 7 | 8, 6 | 8, 7 |
| 15, 16 | 17, 18 | 19, 20 | 21, 22 | 23, 24 | 25, 26 | 27, 28 |
| 8, 4 | 8, 7 | 8, 6 | 8, 7 | 8, 5 | 8, 7 | 8, 6 |
| 29, 30 | 31, 32 | 33, 34 | 35, 36 | 37, 38 | 39, 40 | 41, 42 |
| 8, 7 | 8, 3 | 8, 7 | 8, 6 | 8, 7 | 8, 5 | 8, 7 |
| 43, 44 | 45, 46 | 47, 48 | 49, 50 | 51, 52 | 53, 54 | 55, 56 |
| 8, 6 | 8, 7 | 8, 4 | 8, 7 | 8, 6 | 8, 7 | 8, 5 |
| 57, 58 | 59, 60 | 61, 62 | 63, 64 | | | |
| 8, 7 | 8, 6 | 8, 7 | 8, 2 | | | |

It can readily be seen from the above rows of numbers representing the time position of the overflow pulses from stage A that this overflow will be time coincident with $T_8$ pulses twice as often as with $T_7$ pulses and coincident with $T_7$ pulses twice as often as coincident with $T_6$ pulses and coincident with $T_6$ twice as often as coincident with $T_5$ and so forth, since in the lower row of each pair there are twice as many 8's as 7's and twice as many 7's as 6's and twice as many 6's as 5's and twice as many 5's as 4's in the rows of numbers above. In the pulse waveform diagrams of FIGS. 4*a* and 4*b* there are shown clock pulses, $T_8$ pulses and the overflow pulses from counter 32. Each of the overflow pulses shown is numbered in accordance with its relative position between $T_8$ pulses and successive $T_8$ pulses are numbered from 1–39, corresponding to the upper row of numbers in each pair of rows in the table above.

Figure 4A:
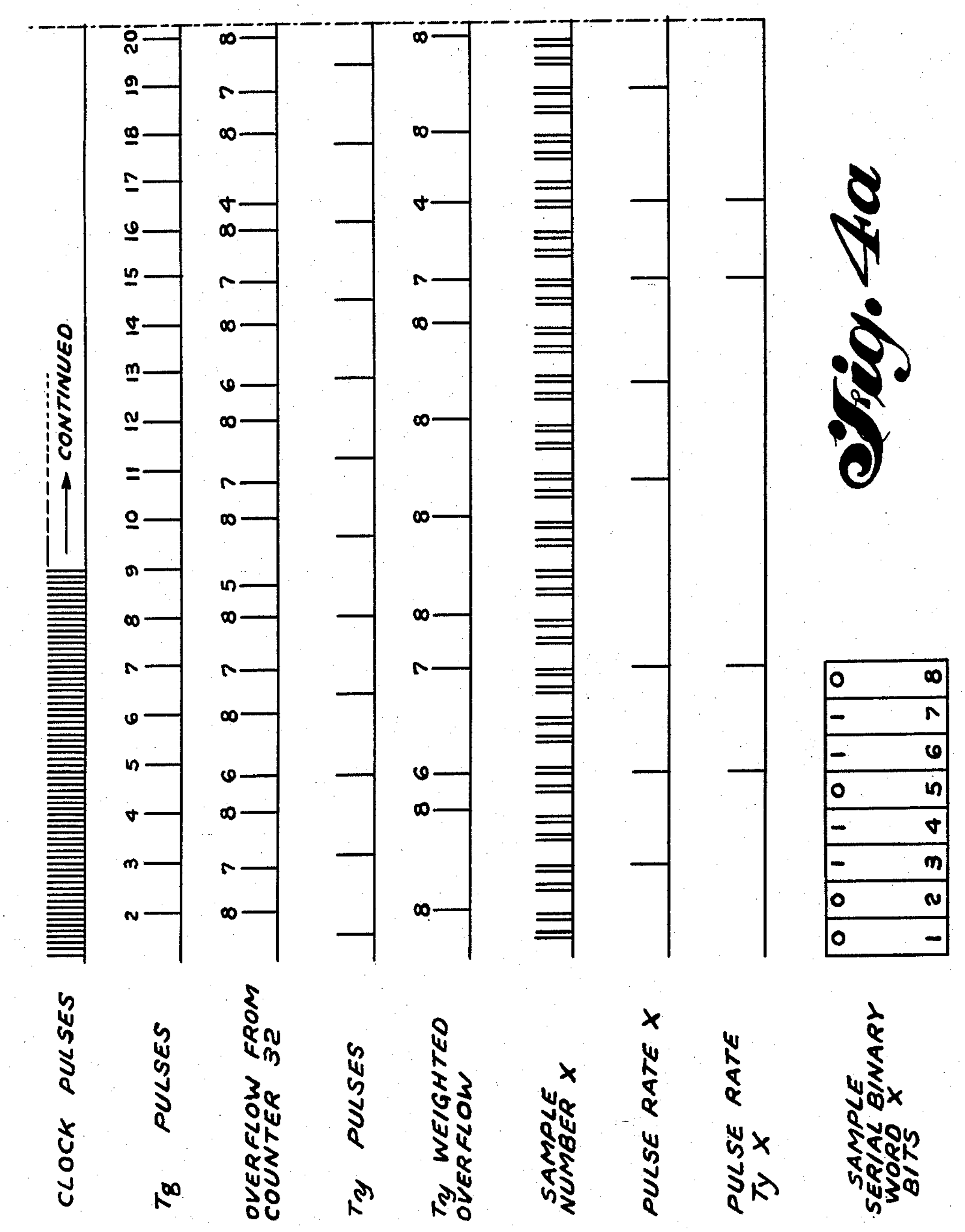
FIGS. 4*a* and 4*b* depict various pulse waveforms illustrating the operation of the system shown in FIG. 3.
Figure 4B:
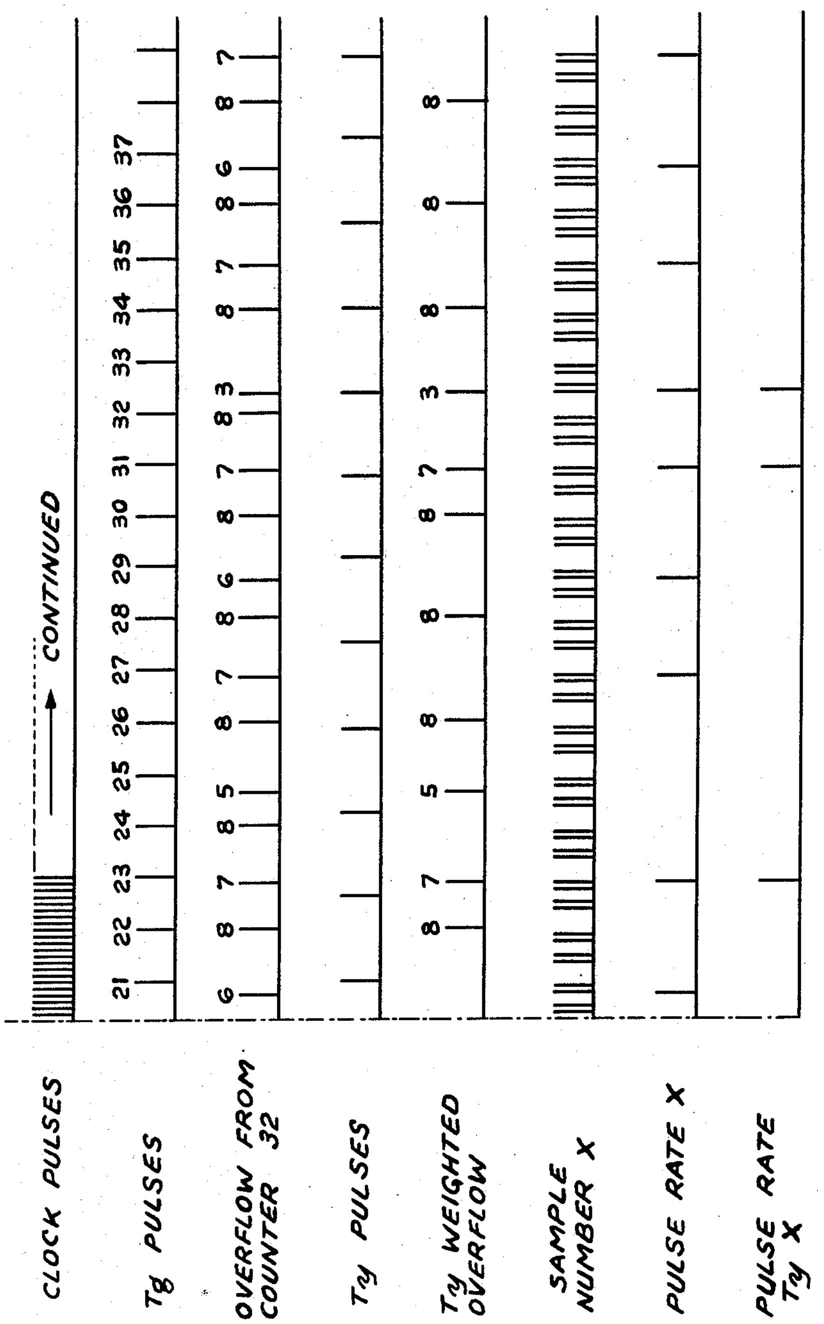

If the eight-bit number stored in device 19 is a binary weighted number, such as represented by sample number X, shown in FIG. 4*a*, then coil 24 will be energized by pulses as shown by the pulse waveform denoted sample number X. Consequently, upon applying the overflow pulses from stage A of binary counter 32, via switch 33 to "and" gate 34 and also applying the pulses which energize coil 24 to "and" gate 34, the output from "and" gate 34 will be a pulse rate representative of the number X and these pulses are shown as the pulse waveform denoted pulse rate X in FIGS. 4*a* and 4*b*. The pulse rate X may be applied to a suitable integrating type filter for producing a D.C. voltage signal representative of the pulse rate X and the stored number X.

For some applications it may be desired to modify the pulse rate X to be representative not only of the number X stored in device 19, but to also be representative of and proportional to a pulse rate denoted $T_y$. For this purpose, circuit 35 is employed which includes a double input bistable flip-flop circuit 36 having one stage responsive to overflow pulses from stage A of binary counter 32, fed thereto via delay device 37, and the other stage responsive to pulses from a $T_y$ pulse generator 38. Pulses from $T_y$ pulse generator 38 are shown as $T_y$ pulses in waveform diagrams of FIGS. 4*a* and 4*b*. The output from stage **36*b* of flip-flop circuit 36 as well as the output from stage A of binary counter 32 are applied to "and" gate 39. The output from $T_y$ pulse generator 38 as well as the output from stage A, of counter 32 are applied to "and" gate 40 and "and" gates 39 and 40 have their outputs applied to "or" gate 41. The output of "or" gate 41, as well as the output from stage A of counter 32, are applied to a switch 33 which serves to feed one of these outputs to "and" gate 34 as determined by the action of switch control 42. Switch 33 may be any suitable electronic switch and control 42 may be used for producing control voltage for the switch causing it to feed one or the other of its inputs to "and" gate 34**.

In operation circuit 35 acts to select each overflow pulse from stage A of counter 32 following a $T_y$ pulse and this is accomplished by maintaining stage **36*a* of flip-flop circuit 36 energized subsequent to the occurrence of each $T_y$ pulse just long enough to allow the following overflow pulse to be fed through "and" gate 39 to "or" gate 41 before stage 36** is de-energized so as to be in condition for energization by the next $T_y$ pulse. This operation is shown by the pulse waveforms of FIGS. 4*a* and 4*b* where it will be noted that $T_y$ weighted overflow pulses from "or" gate 41 include the first overflow pulses from counter 32 which follows each $T_y$ pulse. Consequently, upon gating $T_y$ overflow pulses with sample number X pulses in "and" gate 34, the pulse rate denoted $T_yX$ is generated and this pulse rate is proportional to the product of the number X times the pulse rate $T_y$.

Obviously, other types of circuit combinations could be employed to achieve the same results as the system shown in FIGS. 1 and 3. For example, the counters A, B and C in FIG. 1 could be replaced by a single ring counter, various stages of which are to control the "and" gates, shown in that figure. The outputs of each of the counters A, B and C or the output of counter A could be coupled to the input of counter B via a delay device and the output of counter B could be coupled to the input of counter C via a delay device with parts therebetween serving to control the "and" gates 7, 8 and 9. In the system shown in FIG. 3, a serial number storage device other than the magnetostrictive type shown for storing the number X could be employed and the clock pulse rate could be any integral number of times greater than the bit circulation rate of a number stored in the device. For example, it could be M times greater. Furthermore, other types of circuits could be employed to encompass the various functions described by the system shown in the figures without deviating from the spirit and scope of the invention as set forth in the accompanying claims.

I claim:

1. A device for generating a signal rate proportional to a multiple bit serial-digital number comprising means for storing said serial-digital number, pulse generating means, pulse frequency dividing means coupled to said pulse generating means, first counting means coupled to said frequency dividing means, second counting means coupled to said pulse generating means, means coupling predetermined stages of said first counting means to predetermined stages of said second counting means whereby predetermined binary numbers are set in said second counter each time said frequency dividing means feeds a pulse to said first counting means and coincidence detecting means coupled to said serial-digital number storage means and the overflow from said second counting means for producing said signal rate proportional to said stored number.

2. A device for generating a signal rate proportional to a multiple bit serial-digital number represented by N bits comprising a clock pulse generator, means for storing said N bit number whereby successive bits thereof are equally spaced and in time coincidence with said clock pulses, pulse selection means coupled to said clock pulse generator for selecting a single predetermined clock pulse in time coincidence with one of said successive bits during each interval of MN clock pulses, where M is any integer greater than 0, the last clock pulse of said interval MN being selected P times as often as the second from last clock pulse of said interval MN, the second from last clock pulse of said interval MN being selected P times as often as said third from last clock pulse of said interval MN, the third from last clock pulse of said interval MN being selected P times as often as said fourth from last clock pulse of said interval MN and so forth; and coincidence detecting means coupled to the output of said pulse selection means and the output of said serial number storage means for producing said signal rate.

3. A device for generating a signal rate proportional to a multiple bit serial-binary number represented by N bits comprising a clock pulse generator, means for storing said number whereby successive bits thereof are in time coincidence with successive clock pulses, pulse rate selection means coupled to said clock pulse generator to select a single predetermined clock pulse in time coincidence with one of said successive bits during each interval of N clock pulses, the last pulse of said interval being selected twice as often as the second to last pulse of said interval, the second from last pulse of said interval being selected twice as often as the third from last pulse of said interval, the third from last pulse of said interval being selected twice as often as the fourth from last pulse of said interval and so forth; and coincidence detecting means coupled to the output of said pulse selection means and the input of said storing means for producing said signal rate.

4. A device for generating a signal rate proportional to a serial-digital number represented by N bits, each successive bit representing a quantity P raised to a greater power than the preceding bit comprising a clock pulse generator, means for storing said number whereby said successive bits thereof are in time coincidence with said clock pulses, pulse selection means coupled to said clock pulse generator to select a given predetermined clock pulse in time coincidence with one of said successive bits during each interval of NM clock pulses, where M is any integer greater than 0, the $M$ times $(N-n)$ pulse being selected P times as often as the $M$ times $(N-n-1)$ pulse where $n$ represents any particular bit from 1 to N and coincidence detecting means coupled to the output of said pulse selection means and the input of said storing means for producing said signal rate.

5. A digital-to-analog converter comprising a clock pulse generator, means for storing a multiple bit serial binary number synchronized with said clock pulse generator, a frequency divider coupled to said generator, a first binary pulse counter coupled to said frequency divider, a differentiator coupled to each stage of said first counter, a second counter coupled to said generator for counting clock pulses, means coupling said differentiators to selected stages of said second counter to thereby set selected numbers in said second counter where said first counter counts each pulse from said frequency divider, a coincidence gate responsive to the carry signal from the last stage of said second counter and responsive to said stored bits producing a pulse rate representative of said stored number and integrating means coupled to said gate producing an analog signal representative of said stored digital number.

6. A digital-to-analog converter comprising a clock pulse generator, means for storing an N bit serial binary number synchronized with said clock pulses, a $1/N$ times frequency divider coupled to said generator, an N stage binary pulse counter coupled to said frequency divider, a differentiator coupled to each of said N stages, a second binary pulse counter having $1n\ N/1n2$ stages coupled to said generator for counting clock pulses, means coupling each of said differentiators to selected stages of said second counter to set selected numbers therein, a coincidence gate responsive to the carry signal from the last stage of said second counter and responsive to said stored bits producing a pulse rate representative of said stored number and integrating means coupled to said gate producing an analog signal representative of said stored digital number.

References Cited in the file of this patent

UNITED STATES PATENTS

| | | |
|---|---|---|
| 2,711,499 | Lippel | June 21, 1955 |
| 2,886,753 | Abbott | May 12, 1959 |
| 2,894,254 | Mork | July 7, 1959 |
| 2,907,021 | Woods | Sept. 29, 1959 |
| 2,910,237 | Meyer et al. | Oct. 27, 1959 |
| 2,913,179 | Gordon | Nov. 17, 1959 |